(12) United States Patent
Hermanson

(10) Patent No.: US 6,954,219 B2
(45) Date of Patent: Oct. 11, 2005

(54) METHOD AND SYSTEM OF CONTINUOUSLY SCALING VIDEO IMAGES

(75) Inventor: Theodore H. Hermanson, Palmyra, PA (US)

(73) Assignee: STMicroelectronics, Inc., Carrollton, TX (US)

(*) Notice: Subject to any disclaimer, the term of this patent is extended or adjusted under 35 U.S.C. 154(b) by 367 days.

(21) Appl. No.: 10/021,283

(22) Filed: Dec. 12, 2001

(65) Prior Publication Data

US 2003/0117419 A1 Jun. 26, 2003

(51) Int. Cl.⁷ .................................................. G09G 5/00
(52) U.S. Cl. ........................ 345/660; 345/661; 345/667
(58) Field of Search ................................. 345/660–671; 382/298; 358/451; 348/561, 704, 581–582

(56) References Cited

U.S. PATENT DOCUMENTS

| | | | | |
|---|---|---|---|---|
| 4,546,349 A | | 10/1985 | Prohofsky et al. ........... | 340/731 |
| 5,214,519 A | * | 5/1993 | Faulhaber et al. ........... | 358/451 |
| 5,276,787 A | | 1/1994 | Searby ........................ | 395/132 |
| 5,374,995 A | | 12/1994 | Loveridge et al. .......... | 358/447 |
| 5,453,846 A | * | 9/1995 | Tsao et al. ................... | 358/448 |
| 5,774,110 A | | 6/1998 | Edelson ....................... | 345/132 |
| 5,960,126 A | * | 9/1999 | Nielsen et al. .............. | 382/298 |
| 6,178,272 B1 | * | 1/2001 | Segman ....................... | 382/298 |
| 6,185,476 B1 | * | 2/2001 | Sakai ........................... | 700/182 |
| 6,313,822 B1 | | 11/2001 | McKay et al. ............... | 345/132 |
| 6,313,828 B1 | | 11/2001 | Chombo ...................... | 345/169 |
| 6,407,723 B1 | * | 6/2002 | Okuno et al. ................ | 345/3.2 |
| 6,437,787 B1 | * | 8/2002 | Wu ............................. | 345/519 |
| 6,456,329 B1 | * | 9/2002 | Tinker et al. ................ | 348/448 |
| 6,585,594 B2 | * | 7/2003 | Togo et al. ................... | 463/31 |

FOREIGN PATENT DOCUMENTS

| | | | | |
|---|---|---|---|---|
| EP | 0 367 418 A2 | 5/1990 | ........... | G06F/15/62 |
| EP | 0 671 850 A2 | 9/1995 | .......... | H04N/5/262 |
| WO | 00/16263 | 3/2000 | ............. | G06T/3/40 |

OTHER PUBLICATIONS

"Handbook of Image and Video Processing," Academic Press, Jun. 13, 2000, pp. 35, 36, 94, and 95.

* cited by examiner

*Primary Examiner*—Matthew C. Bella
*Assistant Examiner*—Po-Wei Chen
(74) *Attorney, Agent, or Firm*—Lisa K. Jorgenson; Christopher F. Regan (57) ABSTRACT

A method and system of scaling images on a video display is disclosed. A video data stream is processed into video data, which is displayed on a video display at a predetermined aspect ratio. A user manipulable controller, such as a joystick, is operative with a graphics processor unit for scaling images on the video display by obtaining video source values of pixel width and height to be displayed and determining the smallest integer increment on the x/y axis that will maintain the desired aspect ratio using a greatest common denominator to reduce the ratio to the lowest integer.

46 Claims, 2 Drawing Sheets

METHOD AND SYSTEM OF CONTINUOUSLY SCALING VIDEO IMAGES

FIELD OF THE INVENTION

This invention relates to the field of video displays, and more particularly, this invention relates to scaling video images on a video display.

BACKGROUND OF THE INVENTION

Increasing numbers of video game systems have built-in three-dimensional audio processors, a three-dimensional graphics processor unit (GPU), a high speed central processing unit (CPU) with high speed bus transfer rates, built-in hard drives, and a large megabyte unified memory. Typically included in these video game systems are various types of removable memory cards, custom game controller ports, HDTV ports, expansion card ports, and often, a built-in DVD (digital versatile/video disc) player with the appropriate DVD software drivers for drawing the apparatus. Examples of such systems include various video games from Sony Corporation, such as the Play Station 2, the Nintendo Game Cube, and the XBox game system from Microsoft Corporation. For example, the XBox game system includes a front loading DVD tray operative with the DVD player and software drivers, four game controller ports to allow multi-player gaming and ports for allowing connection of other peripherals, including game pads and voice-activated headsets. This system also includes an Ethernet port for broadband connection, a NVIDIA graphics processing unit (GPU), an Intel 733 MHz processor, and an internal hard drive.

In some prior art video game systems, and in many consumer DVD players, any scaling or zooming of images has been provided as a "stepped" zoom functionality that is typically accomplished by pressing a zoom button. Once the zoom button is pressed, several different zooming functions can follow. For example, in a first zooming function, the current view is magnified twice or by some other arbitrary resolution. For example, if one is viewing 720×480 pixels of source content on a 720×480 display, and a viewer hits "zoom," the viewer then views 360×240 pixels of source content, scaled to fit on a 720×480 video display. Any sequential pressing of the zoom button increments the zoom level by the same arbitrary magnification level. In yet another zooming function, a pan-able bracket [ ] is displayed on the monitor screen or other video display and designates an area that will be zoomed to full screen upon the next "ENTER" button depression. This type of "zooming" method and function also increases the magnification level by a fixed arbitrary amount. One of the drawbacks of this type of prior art system is that it does not allow a user to pan a zoomed image in "real-time" and does not provide a user with the means to increase or decrease the zoom level in a perceptibly continuous fashion.

SUMMARY OF THE INVENTION

The present invention advantageously provides a method of scaling images continuously on a display for continuous zooming functions. In one aspect of the present invention, video data is generated as a video data stream and displayed on a video display at a predetermined aspect ratio. During playback or in a pause mode, video source values of pixel width and pixel height to be displayed are obtained. The smallest integer increment on the x/y axis that will maintain the desired aspect ratio is determined by using a greatest common denominator to reduce the ratio to the lowest integer.

The video data stream can be generated from a DVD (digital versatile/video disc) player or as a high definition television (HDTV) signal. It is possible to manipulate a joystick for initiating the zooming function and scale images on the video display. The joystick could be moved up to increase zoom magnification by a predetermined number of pixels or moved down to decrease zoom magnification by a predetermined number of pixels until fully zoomed out. A second joystick could be manipulated to vary the x/y position of the zoomed region in a continuous fashion.

In yet another aspect of the present invention, the video data could be displayed on a video display that is operatively connected to a game port of a video game box containing a DVD player or similar optical disc reader, a central processing unit, and a graphics processor unit.

In yet another aspect of the present invention, it is possible to designate a destination region on the display for displaying the video source values to be displayed. If the area of video source data does not correspond one-to-one with the area of the destination region, the video source data is scaled in a graphics processor unit.

A method of operating a video game is also set forth and comprises the steps of processing a video data stream as generated from an optical disc player and displaying video data on a video display at a predetermined aspect ratio. A game controller is manipulated for continuously scaling images on the video display by obtaining video source values of pixel width and height to be displayed and determining the smallest integer increment on the x/y axis that will maintain the desired aspect ratio by using a greatest common denominator to reduce the ratio to the lowest integer in response to a predetermined manipulation of the game controller.

A video display system is also set forth and includes a central processing unit and associated graphics processor unit for processing a video data stream and generating video data to be displayed. A video display receives video data and displays a video image at a predetermined aspect ratio. A user manipulable controller is operative with the graphics processor unit for scaling images on the video display by obtaining video source values of pixel width and height to be displayed and determining the smallest integer increment on the x/y axis that will maintain the desired aspect ratio using a greatest common denominator to reduce the ratio to the lowest integer.

In another aspect of the present invention, the video display comprises a television. An optical disc reader, such as a DVD (digital versatile/video disc) player, is included as part of a video game system for producing the video data stream. The video data stream can also comprise a high definition television (HDTV) signal. A user manipulable controller can include one or more joysticks.

BRIEF DESCRIPTIONS OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides an advantage over prior art "stepped" scaling and zoom functionality common with consumer DVD players, video game systems using optical disc players such as DVD players, and similar video systems that receive a video data stream resulting from a DVD or optical disc player, high definition TV (HDTV) signal, or other similar video production system. Many prior art systems were limited and operative by pressing a zoom button on a game controller or other system that would magnify by twice or by some other arbitrary resolution the current view displayed on an LCD or video display screen. For example, if a viewer is viewing 720×480 pixels of source content on a 720×480 display, when the viewer hits the zoom button, the viewer would then view 360×240 pixels of source content, scaled to fit on the 720×480 display. Sequential depression of the zoom button would increment the zoom level by the same arbitrary magnification level. In another prior art "stepped" zoom functionality system, a pan-able bracket [] was displayed on the screen, designating the area that would be zoomed to full screen upon the next pressing of the "ENTER" button. This method also allowed the increase of the magnification level by a fixed arbitrary amount.

Drawbacks of these two types of prior art systems are that the systems did not allow a user to pan the zoomed image in "real-time," and did not provide a user with the means to increase or decrease the zoom level in a perceptably continuous fashion.

The present invention advantageously allows a continuous zoom feature for use with a displayed video image, such as displayed video data as from a processed video data stream resulting from a DVD or HDTV viewer driven by a multi-directional controller, for example, a pair of joysticks of a game pad controller or other similar controller.

Scaling can be accomplished on a graphics processor unit (GPU). When a zoom function occurs, such as by manipulating a game controller or joystick, the coordinates of the source data one wishes to display is set and a destination area for display is designated, for example, on a full screen 640×480 pixel display. If the area of the source data does not correspond one-to-one with the area of the designation region, the graphics processor unit can scale the data in hardware. Although it is possible to use software scaling, it is more CPU intensive, as in the use of other common prior art software scaling systems that make intensive use of software algorithms and CPU resources. The present invention is also applicable for maintaining an aspect ratio in some given regions, which does not need to be fractionally scaled, giving visibly better results in these instances. The scaling is used in a continuous fashion and can be zoomed and panned simultaneously and optimized for stability.

The present invention can first be operable by viewing a display that displays DVD or HDTV video data at a normal source resolution, as a non-limiting example. Naturally, other source video data can be used, including, data generated from a hard disc, optical disc, Internet, or other source known to those skilled in the art. The description proceeds with a description relative to a DVD or HDTV viewer because these video data streams are presently encompassed in the use of many video game systems.

The DVD or HDTV viewer software can be driven by a multi-directional controller, such as a pair of joysticks on a game pad controller. At any time during normal playback or still playback, a controller with X/Y coordinates is moved to vary continuously the current zoom magnification. For instance, moving a joystick up could increase the zoom magnification by a very small number of pixels, while moving a joystick down could decrease the zoom magnification until it is fully zoomed out. If a second joystick is available on the game controller or in a game pad, this control could vary the X/Y position of the zoomed region in a continuous fashion.

The present invention also provides a novel and unobvious zoom feature in a consumer DVD or HDTV playback device and provides a smooth centering algorithm that ensures a zoomed rectangle always retains its perspective with relation to the entire source and minimizes jitter or "bob" effects.

Although the description will follow with reference to a DVD player, it should be understood that any video data stream can be processed, including data streams produced by compact disc, video disc, tape, cassette, or other digital video data stream. DVD has become more common for containing video data with its seven-fold increase in data capacity over CD by tightening tolerances throughout the system. Other aspects of the present invention regarding the aspect ratio are known to those skilled in the art. The use of joysticks and game ports are commonly known to those skilled in the art. The term "high definition television" (HDTV) refers to the several methods for obtaining greater detail into a television picture that is an improvement over the more conventional National Television Systems Committee (NTSC) TV signal.

Figure 1:
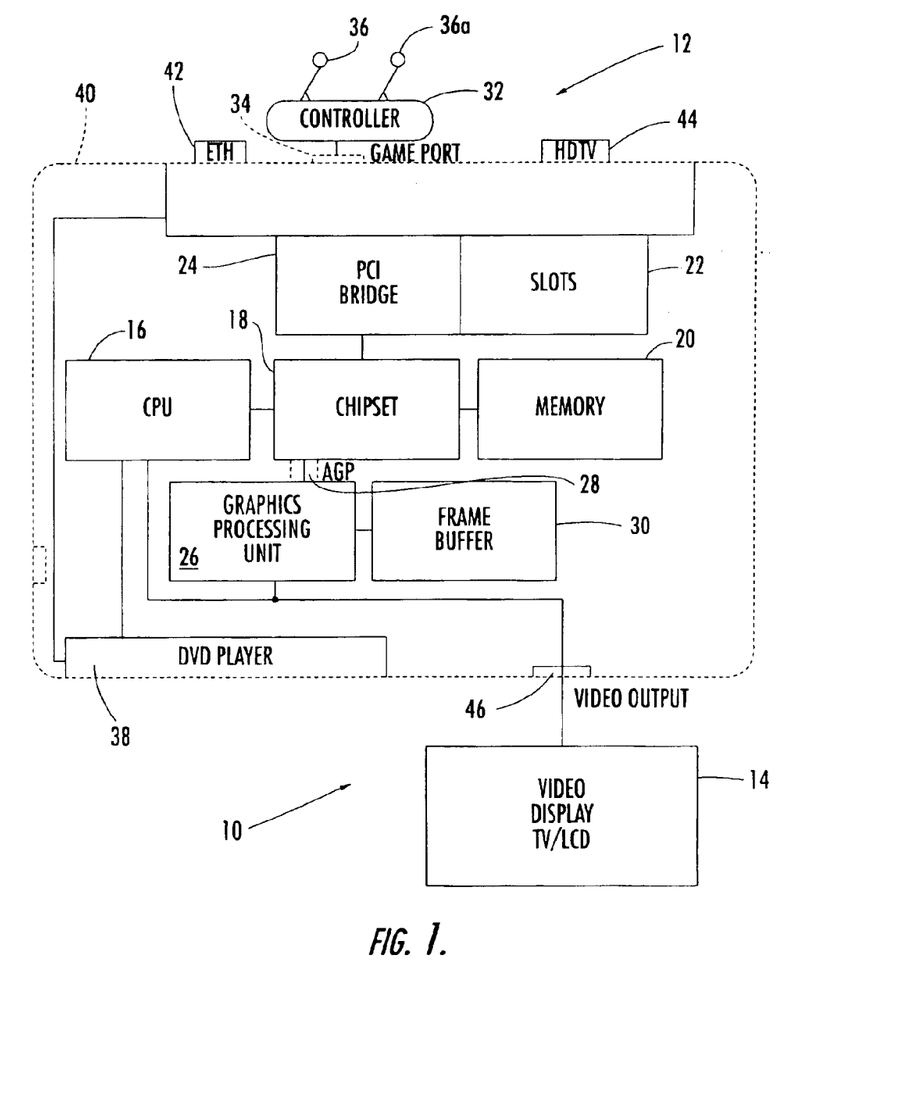
FIG. 1 is a high level block diagram of a video display system as part of a video game system in accordance with the present invention.

Referring now to FIG. 1, there is shown a video display system 10 as part of a video game system 12 using the method and system of scaling images continuously on a video display 14 in accordance with the present invention. Although many different types central processing units (CPU), graphic processing units (GPU), chip sets, memory devices, bridges, slots, frame buffer circuits, and other game and video display and system architectures could be used in accordance with the present invention, the present invention is described relative to the video game system architecture shown in FIG. 1.

As illustrated, the video game system 12 includes a central processing unit 16 and a chip set 18 with associated support circuits that provide signals for the microprocessor and link the various systems and peripherals. A main memory 20 is operatively connected to the chip set 18. Various slots 22, known to those skilled in the art, such as PCI slots and ISA slots, are connected into a bridge 24, such as a PCI bridge, as illustrated. A graphics processing unit (GPU) 26, such as an NVIDIA graphics processing unit, is operatively connected to the chip set 18 and includes in the illustrated embodiment an advanced graphic port 28 and a frame buffer 30, as known to those skilled in the art. The advanced graphic port 28 incorporates dedicated, pipeline access to main memory via the chip set 18 or other means known to those skilled in the art. It can move data between a dedicated frame buffer 30 and main system memory 20.

Various expansion cards can be included as requested by a user or those skilled in the art.

A controller 32, e.g., a game controller, is operatively connected to the CPU 16 and graphics processing unit 26 via the slots 22, PCI bridge 24 or game port 34, as illustrated. The controller 32 includes a joystick, and in the illustrated embodiment, two joysticks 36, 36a. A DVD player 38 is part of the overall system and typically included in one video game housing 40 that contains most or all system components. The DVD player 38 is driven by appropriate DVD software drivers, as known to those skilled in the art. An ethernet port 42 is included and a high definition television (HDTV) port 44 for receiving HDTV signals or generating HDTV signals with the graphics processing unit 26, as known to those skilled in the art.

The video display 14 could be incorporated integral with the system or be connected via wireless or wireline connection through a video output port 46 to a television, HDTV, LCD or other video display, as known to those skilled in the art.

Figure 2:
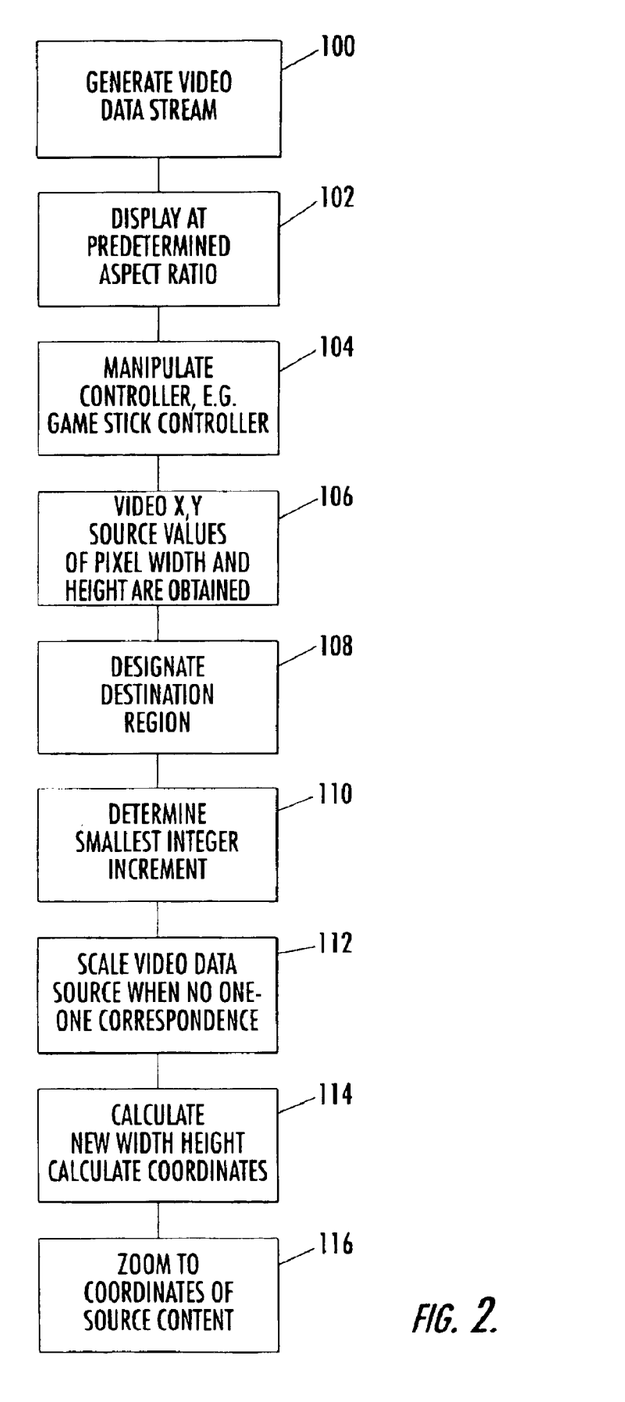
FIG. 2 is a high level flow chart illustrating a basic method of scaling images in accordance with the present invention.

FIG. 2 illustrates a basic high level flow chart illustrating the method and system of the present invention. The system is described relative to operating a video game.

A video data stream is generated from an optical disc player such as the illustrated DVD player (FIG. 1) and processed (Block 100). Video data is displayed on a video display at a predetermined aspect ratio (Block 102).

A game controller, such as a joystick, is manipulated (Block 104). Video x/y source values of pixel width and height to be displayed are obtained (Block 106). A destination region on the video display is designated for displaying the video source values to be displayed (Block 108). The smallest integer increment on the x/y axis that will maintain the desired aspect ratio is determined by using a greatest common denominator to reduce the ratio to the lowest integer (Block 110). If the area of video source data does not correspond one-to-one with the area of the destination region, the video source data in the graphics processor unit is scaled (Block 112).

Scaling can occur by calculating a new width and height as in current pixel width and height and width and height increment to be displayed and fixing an x and y position as fixed x and y center points minus or plus any respective new width and height divided by two (Block 114). The system zooms to the newly calculated coordinates of source content (Block 116).

A representative pseudo code is set forth below and shows the functional algorithm in high level format:

// first get the source video width and height
Get Source Video Dimensions(& source Width, & source Height);
// now, using the source values, determine the smallest increments that will maintain the correct
// aspect ratio by using greatest common denominators, thus allowing smooth scaling
Reduce Ratio To Lowest Integers (source Width, source Height, & XzoomIncrement, YzoomIncrement);

```
If (joystickMoved)
{
        if (ZoomingOut)
        {
                // check for maximum limits
                if ((CurrentOutputWidth + XzoomIncrement < MaximumWidth)
                        &&
                        (CurrentOutputHeight + YzoomIncrement < MaximumHeight))
                {
                        NewWidth = CurrentOutput Width + XzoomIncrement
                        NewHeight = CurrentOutputHeight + YzoomIncrement
                        Xposition = FixedXCenterPoint - NewWidth/2
                        Yposition = FixedYCenterPoint - NewHeight/2
                        // zoom to newly calculated coordinates of source content
                        Zoom(Xposition , Yposition, NewWidth, NewHeight)
                }
        }
        else
        // zooming in
        {
                // check for maximum limits
                if ((CurrentOutputWidth - XzoomIncrement > MinimumWidth) &&
                        (CurrentOutputHeight - YzoomIncrement > MinimumHeight))
                {
                        NewWidth = CurrentOutputWidth - XzoomIncrement
                        NewHeight = CurrentOutputHeight - YzoomIncrement
                        Xposition = FixedXCenterPoint - NewWidth/2
                        Yposition = FixedYCenterPoint - NewHeight/2
                        // zoom to newly calculated coordinates of source content
                        Zoom(Xposition , Yposition, NewWidth, NewHeight)
                }
        }
}
```

A more detailed code written in C++ is set forth below as a representative example of the type of code functionally that can be used for the present invention, as a non-limiting example.

```
        if(m_bLThumbStickOn)
        {
                DVD_DOMAIN domain;
                if (S_OK == m_pPlayer->GetCurrentDomain(&domain)
&& (domain != DVD_DOMAIN_Stop))
                {
                        WORD wX, wY;
                        float fScaleFactor;
                        if (S_OK ==
m_pPlayer->Get_CurrentScaleFactor(fScaleFactor))
                        {
                                m_pPlayer->Get_VideoSize(wX, wY);
                                fScaleFactor = max(1, fScaleFactor);
                                WORD xRange = (float) wX * (1.0 -
(1.0/fScaleFactor));
                                WORD yRange = (float) wY * (1.0 -
(1.0/fScaleFactor));
                                if ((m_fLThumbStickX <= -0.75) ||
(m_fLThumbStickX >= 0.75))
                                {
                                        m_nZoomX = (m_fLThumbStickX
<= -0.75) ?m_nZoomX - ZOOM_X_INCREMENT:
                                                        m_nZoomX +
ZOOM_X_INCREMENT;
                                }
                                if((m_fLThumbStickY <= -0.75) ||
(m_fLThumbStickY >= 0.75))
                                {
                                        m_nZoomY = (m_fLThumbStickY
<= -0.75) ?m_nZoomY + ZOOM_Y_INCREMENT:
                                                        m_nZoomY -
ZOOM_Y_INCREMENT;
                                }
                                m_nZoomX = max(0, min(m_nZoomX,
xRange));
                                m_nZoomY = max(0, min(m_nZoomY,
yRange));
                                ResetCenterPoint();
                                HRESULT hr =
m_pPlayer->Trick_Zoom(m_nZoomX, m_nZoomY, m_nZoomW, m_nZoomH);
                        }
                }
        }
        if(m_bRThumbStickOn)
        {
                DVD_DOMAIN domain;
                if (S_OK == m_pPlayer->GetCurrentDomain(&domain)
&& (domain != DVD_DOMAIN_Stop))
                {
                        if((m_fRThumbStickY <= -0.75) ||
(m_fRThumbStickY >= 0.75))
                        {
                                // calc x and y zoom increment based on w/h
ratio
                                // this assures we get a smooth zoom with as
little bob as possible due to scaling
                                WORD wX, wY;
                                m_pPlayer->Get_VideoSize(wX, wY);
                                if (!m_nZoomW) // width/height not yet set
                                {
                                        m_nZoomW = wX;
                                        m_nZoomH = wY;
                                }
                                // reduce the w/h ratio and use a multiple of
those numbers as the base increment
                                int wNum, wDen;
                                ReduceRatio(wX, wY, wNum, wDen);
                                UINT nZoomYInc = wDen *4;
                                UINT nZoomXInc = wNum *4;
                                // minimum width is 2 x Increment,
maximum is full width
                                m_nZoomW = (m_fRThumbStickY <=
-0.75)?
                                        min(m_nZoomW + nZoomXInc, wX)
                                        max(m_nZoomW - nZoomXInc,
nZoomXInc * 2);
                                // minimum Height is 2 x Increment,
```

-continued

```
maximum is full height
                    m_nZoomH = (m_fRThumbStickY <= -0.75)
                        min(m_nZoomH + nZoomYInc, wY)
:
                        max(m_nZoomH - nZoomYInc,
nZoomYInc * 2);
                    // x position depends on our new width
                    WORD xRange = (float) wX - m_nZoomW;
                    // y position depends on our new height
                    WORD yRange = (float) wY - m_nZoomH;
                    if (0 == xRange)
                        ResetZoomVariables();
                    else
                        m_bZoomed = true;
                    // maintain the fixed center point until user
pans
                    if ((!m_CenterPoint.x) &&
(!m_CenterPoint.y))
                        ResetCenterPoint();
                    m_nZoomX = m_CenterPoint.x -
(m_nZoomW / 2.0f);
                    m_nZoomY = m_CenterPoint.y -
(m_nZoomH / 2.0f);
                    m_nZoomX = max(0, min(m_nZoomX,
xRange));
                    m_nZoomY = max(0, min(m_nZoomY,
yRange));
                    HRESULT hr =
m_pPlayer->Trick_Zoom(m_nZoomX, m_nZoomY, m_nZoomW, m_nZoomH);
                }
            }
        }
```

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A method of scaling images continuously on a display comprising the steps of:
    displaying video data generated as a video data stream on a video display at a predetermined aspect ratio;
    during playback or in a pause mode, obtaining video source values of pixel width and pixel height to be displayed;
    determining the smallest integer increment on the video source values of pixel width and pixel height that will maintain the desired aspect ratio by using a greatest common denominator to reduce the ratio to the lowest integer, wherein if the area of video source data does not correspond one-to-one with the area of the destination region, scaling the video source data by calculating a new width and height as in current pixel width and height and width and height increments to be displayed and fixing an x and y position as fixed x and y center points minus or plus any respective new width and height divided by two, such as to allow an increase or decrease in the zoom level in a continuous fashion.

2. A method according to claim 1, and further comprising the step of generating a video data stream from an optical disc player.

3. A method according to claim 1, and further comprising the step of generating a video data stream as a High Definition Television (HDTV) signal.

4. A method according to claim 1, and further comprising the step of manipulating a joystick for initiating a zoom function to scale images of the video display.

5. A method according to claim 4, and further comprising the step of moving the joystick up to increase zoom magnification by a predetermined number of pixels and moving the joystick down to decrease zoom magnification by a predetermined number of pixels until fully zoomed out.

6. A method according to claim 5, and further comprising the step of manipulating a second joystick to vary the x/y position of the zoomed region in a continuous fashion.

7. A method according to claim 1, and further comprising the step of displaying the video data on a video display that is operatively connected to a video game box containing an optical disc player, a central processing unit, a graphics processor unit, and game port.

8. A method according to claim 1, and further comprising the step of processing the video data such that a zoomed rectangle retains its perspective in relation to the video source values to minimize jitter/"bob" effects.

9. A method according to claim 1, wherein if zooming Out an image on the video display, if a current pixel width and height and width and height increment to be added are less than the maximum width and height that can be displayed, then calculating a new width and height as the current pixel width and height and width and height increment to be displayed and fixing an x and y position as fixed x and y center points minus any respective new width and height divided by two.

10. A method according to claim 1, wherein if zooming in an image on the video display, if a current pixel width and height and width and height increment to be added are greater than the minimum width and height that can be displayed, then calculating a new width and height as the current pixel width and height and width and height increment to be displayed and fixing an x and y position as fixed x and y center points minus any respective new width and height divided by two.

11. A method of scaling images continuously on a display comprising the steps of:

displaying video data generated as a video data stream on a video display at a predetermined aspect ratio;

during playback or in a pause mode, obtaining video x,y source values of pixel width and pixel height to be displayed;

designating a destination region on the display for displaying the video source values to be displayed;

determining the smallest integer increment on the video source values of pixel width and pixel height that will maintain the desired aspect ratio by using a greatest common denominator to reduce the ratio to the lowest integer; and if the area of video source data does not correspond one-to-one with the area of the destination region, scaling the video source data in a graphics processor unit by calculating a new width and height as in current pixel width and height and width and height increments to be displayed and fixing an x and y position as fixed x and y center points minus or plus any respective new width and height divided by two, such as to allow an increase or decrease in a zoom level in a continuous fashion.

12. A method according to claim 11, and further comprising the step of generating a video data stream from an optical disc player.

13. A method according to claim 11, and further comprising the step of generating a video data stream as a High Definition Television (HDTV) signal.

14. A method according to claim 11, and further comprising the step of manipulating a joystick for initiating a zoom function to scale images of the video display.

15. A method according to claim 14, and further comprising the step of moving the joystick up to increase zoom magnification by a predetermined number of pixels and moving the joystick down to decrease zoom magnification by a predetermined number of pixels until fully zoomed out.

16. A method according to claim 15, and further comprising the step of manipulating a second joystick to vary the x/y position of the zoomed region in a continuous fashion.

17. A method according to claim 11, and further comprising the step of displaying the video data on a video display that is operatively connected to a video game box containing an optical disc player, a central processing unit, a graphics processor unit, and game port.

18. A method according to claim 11, and further comprising the step of processing the video data such that a zoomed rectangle retains its perspective in relation to the video source values to minimize jitter/"bob" effects.

19. A method according to claim 11, wherein if zooming out an image on the video display, if a current pixel width and height and width and height increment to be added are less than the maximum width and height that can be displayed, then calculating a new width and height as the current pixel width and height and width and height increment to be displayed and fixing an x and y position as fixed x and y center points minus any respective new width and height divided by two.

20. A method according to claim 11, wherein if zooming in an image on the video display, if a current pixel width and height and width and height increment to be added are greater than the minimum width and height that can be displayed, then calculating a new width and height as the current pixel width and height and width and height increment to be displayed and fixing an x and y position as fixed x and y center points minus any respective new width and height divided by two.

21. A method of operating a video game comprising the steps of:

processing a video data stream as generated from an optical disc player and displaying video data on a video display at a predetermined aspect ratio;

manipulating a game controller for continuously scaling images on the video display by obtaining video source values of pixel width and height to be displayed and determining the smallest integer increment on the video source values of pixel width and pixel height that will maintain the desired aspect ratio by using a greatest common denominator to reduce the ratio to the lowest integer in response to a predetermined manipulation of the game controller, wherein if the area of video source data does not correspond one-to-one with the area of the destination region, scaling the video source data by calculating a new width and height as in current pixel width and height and width and height increments to be displayed and fixing an x and y position as fixed x and y center points minus or plus any respective new width and height divided by two, such as to allow an increase or decrease in the zoom level in a continuous fashion.

22. A method according to claim 21, and further comprising the step of manipulating the game controller by manipulating a joystick.

23. A method according to claim 22, and further comprising the step of moving the joystick up to increase zoom magnification by a predetermined number of pixels and moving the joystick down to decrease zoom magnification by a predetermined number of pixels until fully zoomed out.

24. A method according to claim 22, and further comprising the step of manipulating a second joystick to vary the x/y position of the zoomed region in a continuous fashion.

25. A method according to claim 21, and further comprising the step of displaying the video data on a video display that is operatively connected to a video game box containing the optical disc player, a central processing unit, a graphics processor unit, and game port.

26. A method according to claim 21, and further comprising the step of processing the video data such that a zoomed rectangle retains its perspective in relation to the video source values to minimize jitter/"bob" effects.

27. A method according to claim 21, wherein if zooming out an image on the video display, if a current pixel width and height and width and height increment to be added are less than the maximum width and height that can be displayed, then calculating a new width and height as the current pixel width and height and width and height increment to be displayed and fixing an x and y position as fixed x and y center points minus any respective new width and height divided by two.

28. A method according to claim 21, wherein if zooming in an image on the video display, if a current pixel width and height and width and height increment to be added are greater than the minimum width and height that can be displayed, then calculating a new width and height as the current pixel width and height and width and height increment to be displayed and fixing an x and y position as fixed x and y center points minus any respective new width and height divided by two.

29. A method of operating a video game comprising the steps of:

processing a video data stream as generated from a DVD (digital versatile/video disc) player apparatus and displaying video data on a video display at a predetermined aspect ratio;

manipulating a game controller for continuously scaling images on the video display by the steps of obtaining video x,y source values of pixel width and height to be displayed;

designating a destination region on the video display for displaying the video source values to be displayed;

determining the smallest integer increment on the video source values of pixel width and pixel height that will maintain the desired aspect ratio by using a greatest common denominator to reduce the ratio to the lowest integer; and if the area of video source data does not correspond one-to-one with the area of the destination region, scaling the video source data in a graphics processor unit by calculating a new width and height as in current pixel width and height and width and height increments to be displayed and fixing an x and y position as fixed x and y center points minus or plus any respective new width and height divided by two, such as to allow an increase or decrease in a zoom level in a continuous fashion.

30. A method according to claim 29, and further comprising the step of manipulating the game controller by manipulating a joystick.

31. A method according to claim 30, and further comprising the step of moving the joystick up to increase zoom magnification by a predetermined number of pixels and moving the joystick down to decrease zoom magnification by a predetermined number of pixels until fully zoomed out.

32. A method according to claim 30, and further comprising the step of manipulating a second joystick to vary the x/y position of the zoomed region in a continuous fashion.

33. A method according to claim 29, and further comprising the step of displaying the video data on a video display that is operatively connected to a video game box containing the DVD player, a central processing unit, a graphics processor unit, and game port.

34. A method according to claim 29, and further comprising the step of processing the video data such a zoomed rectangle retains its perspective in relation to the entire source to minimize jitter/"bob" effects.

35. A method according to claim 29, wherein if zooming out an image on the video display, if a current pixel width and height and width and height increment to be added are less than the maximum width and height that can be displayed, then calculating a new width and height as the current pixel width and height and width and height increment to be displayed and fixing an x and y position as fixed x and y center points minus any respective new width and height divided by two.

36. A method according to claim 29, wherein if zooming in an image on the video display, if a current pixel width and height and width and height increment to be added are greater than the minimum width and height that can be displayed, then calculating a new width and height as the current pixel width and height and width and height increment to be displayed and fixing an x and y position as fixed x and y center points minus any respective new width and height divided by two.

37. A video display system comprising:
a central processing unit and associated graphics processor unit for processing a video data stream and generating video data to be displayed;
a video display for receiving video data and displaying a video image at a predetermined aspect ratio;
a user manipulable controller operative with said graphics processor unit for scaling images on the video display by obtaining video source values of pixel width and height to be displayed and determining the smallest integer increment on the video source values of pixel width and pixel height that will maintain the desired aspect ratio using a greatest common denominator to reduce the ratio to the lowest integer, and wherein if the area of video source data does not correspond one-to-one with the area of the destination region, scaling the video source data by calculating a new width and height as in current pixel width and height and width and height increments to be displayed and fixing an x and y position as fixed x and y center points minus or plus any respective new width and height divided by two, such as to allow an increase or decrease in the zoom level in a continuous fashion.

38. A video display system according to claim 37, wherein said video display comprises a television.

39. A video display system according to claim 37, and further comprising an optical disc reader, including a DVD (digital versatile/video disc) player, for producing said video data stream.

40. A video display system according to claim 37, wherein said video data stream comprises a high definition television (HDTV) signal.

41. A video display system according to claim 37, wherein said user manipulable controller comprises a joystick.

42. A video display system comprising:
a central processing unit and associated graphics processor unit for processing a video data stream and generating video data to be displayed;
a video display for receiving video data and displaying a video image at a predetermined aspect ratio;
a user manipulable controller operative with said graphics processor unit for scaling images on the video display by obtaining video x,y source values of pixel width and height to be displayed;
designating a destination region on the display for displaying the video source values to be displayed;
determining the smallest integer increment on the video source values of pixel width and pixel height that will maintain the desired aspect ratio by using a greatest common denominator to reduce the ratio to the lowest integer; and
if the area of video source data does not correspond one-to-one with the area of the destination region, scaling the video source data in a graphics processor unit by calculating a new width and height as in current pixel width and height and width and height increments to be displayed and fixing an x and y position as fixed x and y center points minus or plus any respective new width and height divided by two, such as to allow an increase or decrease in a zoom level in a continuous fashion.

43. A video display system according to claim 42, wherein said video display comprises a television.

44. A video display system according to claim 42, and further comprising an optical disc reader, including a DVD (digital versatile/video disc) player, for producing said video data stream.

45. A video display system according to claim 42, wherein said video data stream comprises a high definition television (HDTV) signal.

46. A video display system according to claim 42, wherein said user manipulable controller comprises a joystick.

* * * * *

UNITED STATES PATENT AND TRADEMARK OFFICE
CERTIFICATE OF CORRECTION

PATENT NO.        : 6,954,219 B2
APPLICATION NO. : 10/021283
DATED             : October 11, 2005
INVENTOR(S)      : Hermanson It is certified that error appears in the above-identified patent and that said Letters Patent is hereby corrected as shown below:

Column 4, Line 45     Delete: "types central"
                      Insert: -- types of central --

Column 10, Line 48    Delete: "Out"
                      Insert: -- out --

Column 13, Line 39    Delete: "such a"
                      Insert: -- such as a --

Signed and Sealed this

Sixteenth Day of January, 2007

JON W. DUDAS
*Director of the United States Patent and Trademark Office*